(12) United States Patent  (10) Patent No.: US 8,849,104 B2
Eder et al.  (45) Date of Patent: Sep. 30, 2014

(54) RECORDING DEVICE AND METHOD FOR CAPTURING AND PROCESSING IMAGE DATA IN A VEHICLE

(75) Inventors: Oliver Eder, Pinache (DE); Heinz-Erwin Schaffer, Kornwestheim (DE)

(73) Assignee: SMR Patents S.a.r.l., Luxembourg (LU)

( * ) Notice: Subject to any disclaimer, the term of this patent is extended or adjusted under 35 U.S.C. 154(b) by 980 days.

(21) Appl. No.: 12/504,150

(22) Filed: Jul. 16, 2009

(65) Prior Publication Data

US 2010/0014842 A1  Jan. 21, 2010

(30) Foreign Application Priority Data

Jul. 16, 2008 (EP) .................................. 08160555

(51) Int. Cl.
*H04N 5/76* (2006.01)
*B60R 1/00* (2006.01)
*G07C 5/08* (2006.01)
*B60R 1/12* (2006.01)

(52) U.S. Cl.
CPC .............. *G07C 5/0891* (2013.01); *G07C 5/085* (2013.01); *G07C 5/0866* (2013.01); *B60R 1/00* (2013.01); *B60R 2001/1253* (2013.01)
USPC .......................................... 386/362; 386/358

(58) Field of Classification Search
None
See application file for complete search history.

(56) References Cited

U.S. PATENT DOCUMENTS

| 5,937,086 | A  | * | 8/1999 | Taguchi ........................ 382/165 |
| 2004/0212484 | A1 | * | 10/2004 | Su et al. ........................ 340/435 |
| 2005/0140785 | A1 | * | 6/2005 | Mazzilli ........................ 348/148 |
| 2006/0132602 | A1 | * | 6/2006 | Muto et al. .................... 348/148 |
| 2007/0001836 | A1 | * | 1/2007 | Singer et al. .................. 340/528 |
| 2008/0117031 | A1 | * | 5/2008 | Chiang ....................... 340/425.5 |

FOREIGN PATENT DOCUMENTS

| DE | 4221280 | 1/1994 |
| DE | 102007055404 | 5/2008 |
| WO | 2007042798 | 4/2007 |
| WO | 2007093471 | 8/2007 |

OTHER PUBLICATIONS

European Search Report for application No. EP 08160555 dated Dec. 4, 2008.

\* cited by examiner

*Primary Examiner* — William C Vaughn, Jr.
*Assistant Examiner* — Eileen Adams
(74) *Attorney, Agent, or Firm* — Reising Ethington P.C.

(57) ABSTRACT

A recording device for capturing and processing image data in a vehicle is proposed. The recording device comprises an optical image generating sensor and an image processor for processing image data and a communication processor for bidirectional communication with the vehicle. The image data and additional vehicle data is imaged into the data structure of the vehicle bus system together as mixed data.

7 Claims, 5 Drawing Sheets

RECORDING DEVICE AND METHOD FOR CAPTURING AND PROCESSING IMAGE DATA IN A VEHICLE

BACKGROUND OF THE INVENTION

The invention is based on a priority patent application EP 08160555.2 which is hereby incorporated by reference.

A recording device for capturing and processing image data in a vehicle is proposed, which is configured to combine and store the data of an optical image generating sensor and the data existing in the vehicle. Such a "black box" facilitates the reconstruction of accident events.

Furthermore, a method for capturing and processing image data in a vehicle is described, which produces the data of an optical image generating sensor and other vehicle data in a data flow in a simple manner.

PRIOR ART

Accident recorders or also black boxes record various data directly before an accident and store them reliably. The information, like e.g. camera images from the front and from behind, signal lights, speed, dynamic driving parameters or GPS position can be processed in order to analyze and reconstruct the events of the accident. This is not only advantageous for police, courts and insurances, but the number of accidents and also the fuel burn can be reduced through training. Furthermore, vehicle manufacturers can develop future safety systems based on real accident data and accident profiles. Fast intelligence is particularly advantageous for commercial vehicle fleets, since time loss and cost caused by an accident can be reduced. Lengthy litigation can be avoided and decisions can be made based on objective data.

It is proven that the presence of such a device already leads to more defensive driving. Evaluating accidents is even more important in order to achieve a learning effect. Some cab companies already use the drive recorder, in order to improve the driving of their employees and in order to improve the gas mileage resulting there from. Businesses also use such training events in order to improve their gas mileage and to reduce cost and improve the utilization of their resources. With data memories, this can be implemented in an even simpler and more effective manner. Each employee can evaluate his personal acceleration- and braking profile himself and can also evaluate situations after the fact based on video recordings.

It has been proven by studies, that the cost of accident intelligence per vehicle is reduced by approximately 500 Euros per year with an accident recorder. The fuel savings per year is estimated at an average of 10% in vehicles with such a system. This shows that the investment in an accident data recorder is amortized already after a short period of time.

Additional advantages are conceivable through the cooperation with insurance companies. Motor vehicle insurers have been interested in such systems for quite a while to reduce their costs. Each vehicle with an accident data recorder means less accidents and quicker resolution of damages, which pays for insurers through lower personnel and court expenses. These savings can be used in order to subsidize terminals or to reward drivers with lower rates, who voluntarily use a drive recorder.

Car manufacturers can develop their safety concepts based on real data. Not only accident data are useful in this context. Also, near misses help in the development of preventive safety concepts. A manufacturer with a large database can qualify its new systems more quickly through simulations, which are based on actual events, and the manufacturer can reduce the time to market of such systems.

Accident data recorders are known in the prior art. Thus, DE 197 10 393 A1 describes a method and a device which can record data from the vehicle. In this publication, image data and additional vehicle data is mentioned, which is stored together in a data memory.

DE 102 00 4004 669 A1 also describes an accident data recorder, which is used for comprehensive storage of all different types of video data. These solutions store additional vehicle relevant data besides the image data. It is not being mentioned, how the data is stored and how vehicle relevant data is associated with the image data. However, for various applications in particular, the correlation of the data is important. When the data is to be read out for a test, it is very important that the vehicle data regarding speed is exactly provided to the time correlated image.

Also, in case of an accident, it is important to be able to read out the correlation of the data tamper proof.

Thus, it is the object of the present invention to assure said correlation of data.

SUMMARY OF THE INVENTION

The object is accomplished through the features of the independent claims. The recording device according to the invention for capturing and processing image data in a vehicle comprises an optical image generating sensor and a signal processor for processing image data with a communication processor for bidirectional communication with the vehicle, wherein the image data and additional vehicle data are imaged into the data structure of the vehicle bus system together in a mixed data format.

Additional advantages can be derived from the dependent claims. The data of the image and of the vehicle are imaged for the byte oriented format necessary in CAN-bus. By mixing image and vehicle data per byte, a time correlation is accomplished in a physical correlation of the data. The recording is performed in a storage medium, which is selected in a suitable manner.

Advantageously, the volume of image data is reduced. Since the total image data comprises a very high data volume, it is advantageous to perform the image processing before further processing and thus to reduce the image data volume. Thus, e.g. only the variable components of the image are stored.

Advantageously, an existing dead angle surveillance system is used for recording. Thereby, no separate unit is required as an accident data recorder. The dead angle monitoring system is mounted physically close to an exterior mirror of the vehicle. The unit determines image data for displaying the approach of a vehicle in the dead angle of the mirror. Through the integration of the method according to the invention, the dead angle monitoring system additionally facilitates the processing of vehicle data and their correlation with the image data.

DETAILED DESCRIPTION OF THE DRAWINGS

Figure 1A:
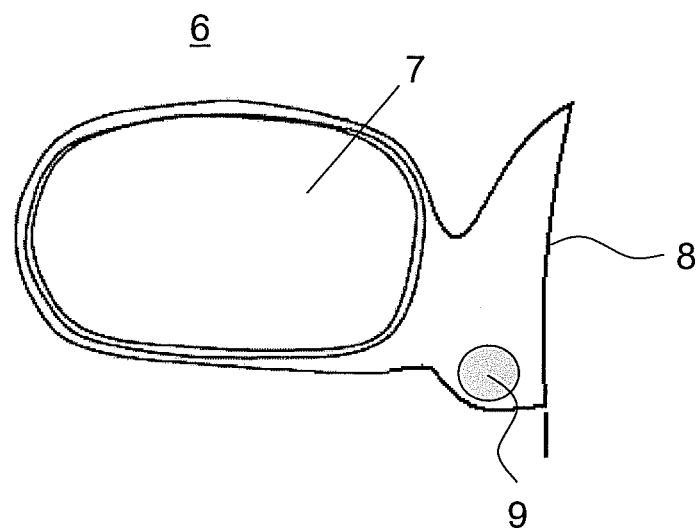
FIG. 1*a*.

FIG. 1a shows an exemplary exterior vehicle mirror 6. The rearview mirror assembly is comprised of a mirror head and a mirror base. The mirror itself is disposed in the mirror head. The mirror head is connected flush with the vehicle contour 8. An optical sensor 9 is disposed in the rearview mirror assembly; in this embodiment in the mirror base or at the mirror base. Each type of sensor is used as an optical sensor, which can be used for image capturing. In this embodiment, another function of the recording device is the analysis of risks, which appear in the dead angle of the mirror. Additional positions at the outside mirror and at the outer contour of the vehicle are possible for the sensor.

Figure 1B:
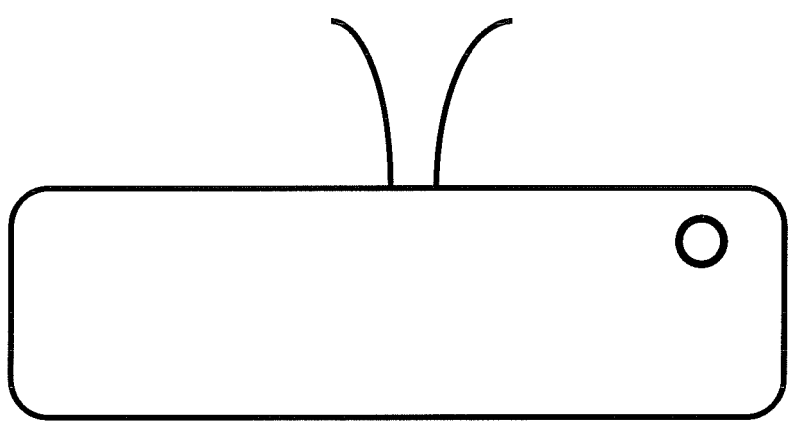
FIG. 1*b* show the installed position of an accident data recorder in an exemplary manner.

FIG. 1b schematically shows an inner vehicle mirror with an optical sensor 9. The inner mirror sensor is used for recording images of the inner space as they are relevant for seat occupancy recognition, driver recognition and for attention assistants. Also here, image data is provided, which can be put to further use in a suitable manner.

Figure 2:
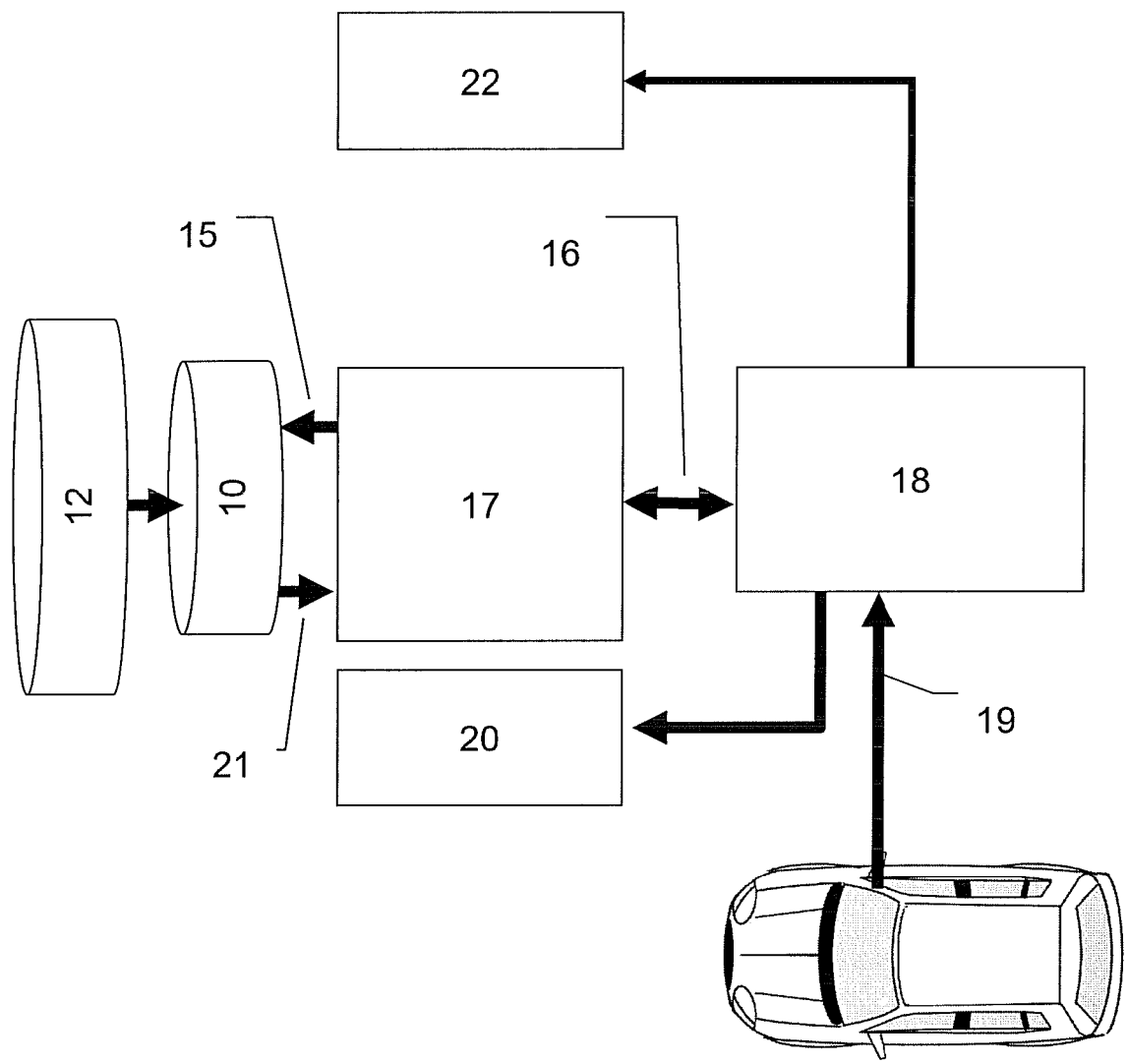
FIG. 2 schematically shows the configuration of the accident data recorder.

FIG. 2 schematically shows the configuration of the optical sensor system. An optical lens 12 is connected in front of a sensor chip 10. The optical chip 10 is connected to an image data link 21 with an image processor 17, which is bidirectionally connected with a communication controller 18. Said communication controller 18 establishes the connection with additional controllers in the vehicle through the vehicle bus, e.g. a LIN-bus or a CAN-bus. Through the communication controller, the output unit 20 is addressed, either directly as implemented in the embodiment, or through the vehicle bus system. The image processor in turn addresses the sensor chip through the sensor control link. The output unit 20 can be a simple LED, which is used for dead angle monitoring, or it can be a warning annunciation in a display, a warning sound, or a haptic warning. The communication controller is furthermore connected to a memory 22, in which the image- and vehicle data is stored.

This configuration is an exemplary embodiment. The functions of the signal processor and of the communication controller can be provided in combination in another embodiment also in one unit. Also, the memory 22 does not have to be provided as a discrete component. Integration into a chip is certainly desirable. The entire assembly of the processing unit fits e.g. into an exterior mirror. The processing unit is thus used in one function for capturing the image data for the danger annunciation, should a vehicle approach in the dead angle. Thus, image data in this embodiment is captured with a time resolution of 30 frames per second. The image data is analyzed and objects like vehicles, thus cars, trucks or motorcycles, and in a further development, buildings, trees and people are recognized. By processing sequential images, the speed is determined, which is processed as a criterion for the warning indication. This way, an approaching vehicle is recognized and a warning indication is given to the driver.

In particular, this information regarding recognized image objects and their relative velocity are relevant for recording an accident event.

When the sensor is disposed in the inner mirror, an attention assistant can be implemented. The image generating sensor monitors the face of the driver. An algorithm running in the image processor processes key information of mimics, and e.g. eyelid movement. There from a warning is generated, should the driver fall asleep.

Figure 3:
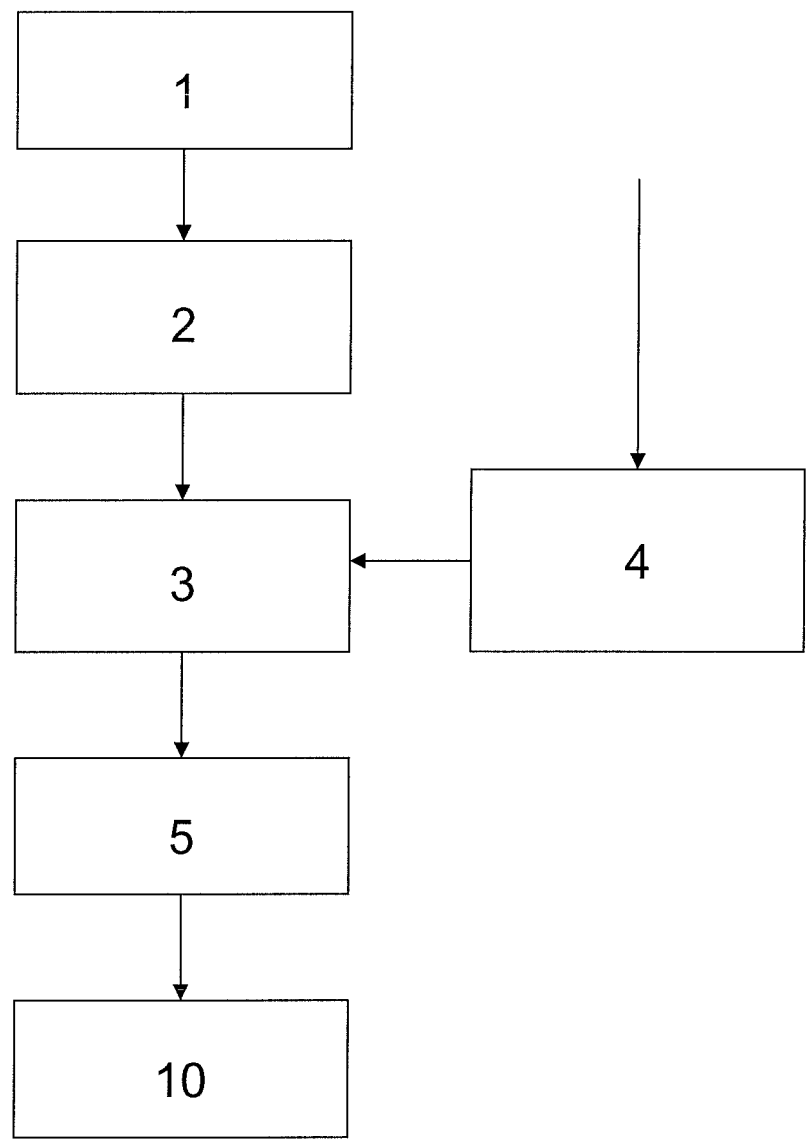
FIG. 3 shows the execution of the method.

FIG. 3 illustrates the execution of the method for processing vehicle- and image data. Step 1 illustrates the image recognition with an optical sensor. The data of the sensor chip is processed in step 2 by a signal processor according to predetermined algorithms. In step 3, the image data is imaged into the data format of the vehicle bus, thus e.g. of the CAN-bus. Through step 4, the additional vehicle data is fed through the vehicle bus system, which flow in combination into the data format of the respective bus system. In step 5, the data is stored in mixed format and the process starts again from the beginning.

Optical sensors as they are used in the invention can be found at different manufacturers. These image sensors comprise e.g. a resolution of $2^0$ through $2^{12}$ bit per pixel. In a normal VGA format with 640×480 pixels or even in a WVGA format with 840×480 pixels, tremendous data volumes are created. This data is provided in an 11- or 12 bit format. In order to implement the advance warning times for detecting dangers in the dead angle, the image capture system operates at 30 Frames per second. These data volumes cannot be easily transferred and cannot be easily stored either.

For transmitting image data, the structure of the CAN-bus is not suited very well. A differentiation is made between a high speed bus and a low speed bus. In a high speed bus, the maximum possible data transfer rate is 1 Mbit/s, which is a value which does not suffice for transmitting an image data flow, and which is not reached in the vehicle either. Furthermore, the bus access is resolved in the CAN-bus without loss by means of the bitwise arbitration based on the identifiers of the message to be transmitted. For this purpose, each transmitter monitors the bus while transmitting the "identifier". When two participants transmit simultaneously, the first dominant bit of one of the two participants overwrites the respective recessive bit of the other participant, wherein the other participant recognizes said fact and terminates its transmission attempt, so that the other participant can transmit its data. This method also provides a hierarchy of the messages amongst each other. The message with the lowest identifier may "always" be transmitted. In order to transmit time critical messages, thus an identifier with high priority can be issued, thus, in order to provide them with priority for transmission. Nevertheless, the point in time of transmission cannot predetermined precisely even for messages with high priority, since in particular, messages, which are just being transmitted cannot be interrupted, and can thus delay the point in time for starting a transmission by up to the maximum message length. Only the maximum transmission delay for the highest priority message can be computed when the maximum message length is known. The CAN-bus is no deterministic bus. In such a bus system, the transmission of image data flows, which would require the entire bandwidth, is not assured and not desirable either.

Figure 4:
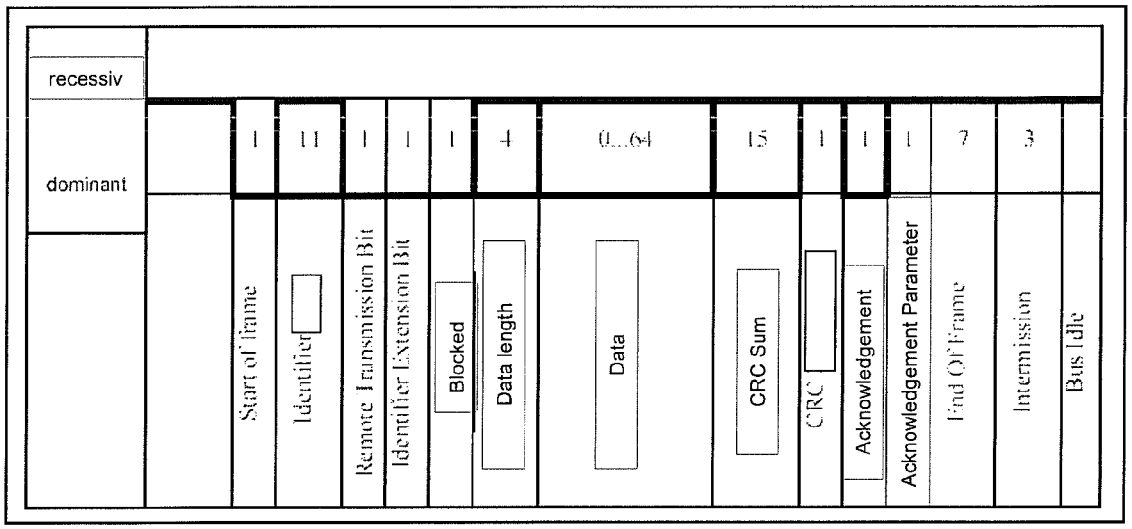
FIG. 4 shows a CAN-data frame.

FIG. 4 shows the data structure of the CAN-data telegram.
A data frame is logically structured as follows:
Start of frame (SOF)=a dominant bit
Arbitration field comprised of an identifier segment (11 bit or 29+2 bit) plus a RTR-bit (Remote Transmission Request)
Control field (CTRL)=6 bit
Data field (DATA)=0-64 bit (in units of 8 bit)
Check sum field (CRC)=16 bit (15 bit CRC plus one recessive CRC-delimiter bit)
Acknowledgment field (ACK)=2 bit, comprised of an ACK-slot plus a recessive ACK delimiter
End of frame (EOF)=7 bit (recessive)

Intermission (IFS—Intermission Frame Space)=3 bit (=min. number of bits, which separates the successive messages)

The image data is processed in the image processor 17 in order to follow the structure of the data telegram. The image data is stored in the data field in units of 8 bit. Thus, in order to reduce data, software filters are used which suppress signal noise. In an improved embodiment, the data is reduced by processing algorithms to the data of the detected objects and of the image change of the recognized objects. Two data byte in combination form a data word with a total of 16 bit of wanted data.

Figure 5:
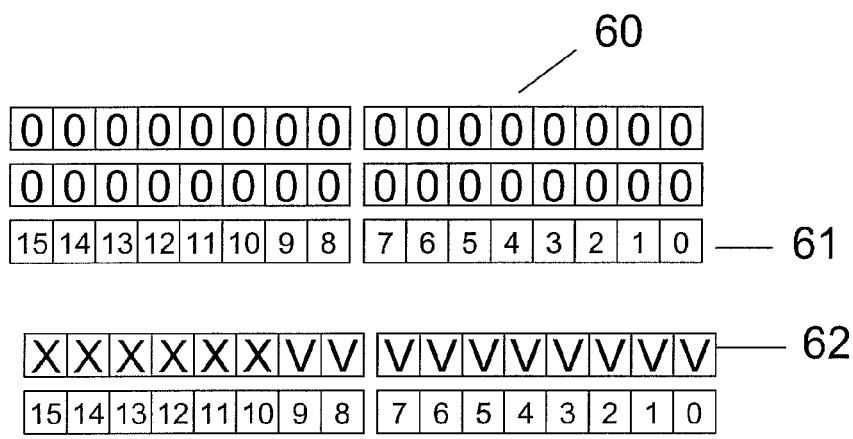
FIG. 5 shows an embodiment for depicting the data in the data frame.

FIG. 5 shows the data structure. The data word 60 includes 16 bit. The writing direction 61 thus increases from the end. The image data 62 is designated with V. 10 bit of image data is written into the data word. Vehicle data, which is designated with X, is written into the remaining 6 bit. In an exemplary manner, sensor data from GPS receiver, velocity-, steering angle-, acceleration-, rain sensor, ESP, ABS, electronic accelerator pedal and image sensors are being mentioned. Since the image data is provided for transmitting and/or storing, in an order of magnitude of up to $10^9$ data words, a sufficient number of unused bits is provided for storing all other vehicle data. The sensor data imaged into the data words of the image data is linked with the image data at the point in time of capture. The resolution of the folded data bit by bit is only possible through special readout software. Thus, the safety of the data storage and also the falsification safety are increased.

The embodiment illustrated in FIG. 5 only constitutes an example of the distribution of the data. The division of the bits between video data and other vehicle data depends on the selected video sensor. Besides the described distribution 12/4, other ratios 10/6 and other ratios are conceivable also and can be implemented through the invention.

Before the vehicle data is written into the data words, it has to be assured that the bits are set to 0. Thus, it is avoided that the vehicle data is falsified by old data values in the data words.

When an accident data recorder is to be implemented through said data volumes, selecting the storage medium becomes one of the critical issues. Transferring the data through the bus to a storage medium is not optimal for the reasons stated supra. Therefore, a storage medium, which is disposed or which is integrated physically proximal to the processors is preferable. However, also storage is not simple. The storage of the data has to be assured over an operating duration of 10 years, wherein temperatures of −40° C. up to +90° C. have to be specified. Starting with a service life of 10 years, and with an image storage frequency of 1 image per second, there are $3\times10^8$ storage events of 1 MB of data respectively. Commercial flash memories, which are suitable media since they do not require any power supply, have been known perform up to 1 Mio writing processes in some cases. Since flash memories age due to their physical principle and cells fail, the repeated writeability of the memory cells is limited. Flash memories are produced with a certain redundancy and are delivered with a software, which masks the failing cells. The use of flash memories is an option of the recording device.

However, the invention can also be practiced with any other storage medium, which is provided to a person skilled in the art through technological development.

In order to be usable as an accident data recorder, the recording device is configured for storing approximately 10 images. These images are retrieved from the data flow each second. The oldest stored image is thus overwritten respectively by the newest one.

In case of interior surveillance, the storing of the image- and vehicle data is performed analogously. Also in this case, the memory provides the data as mixed data. The storage and the readout are performed analogously.

Integrating the image- and vehicle data is not only limited to a potential storage. Another application is the use in the European eCall system according to which automatic accident information shall be transmitted according to the concept of the European Union, in order to guide rescue personnel to the scene of the accident quickly.

Figure 6:
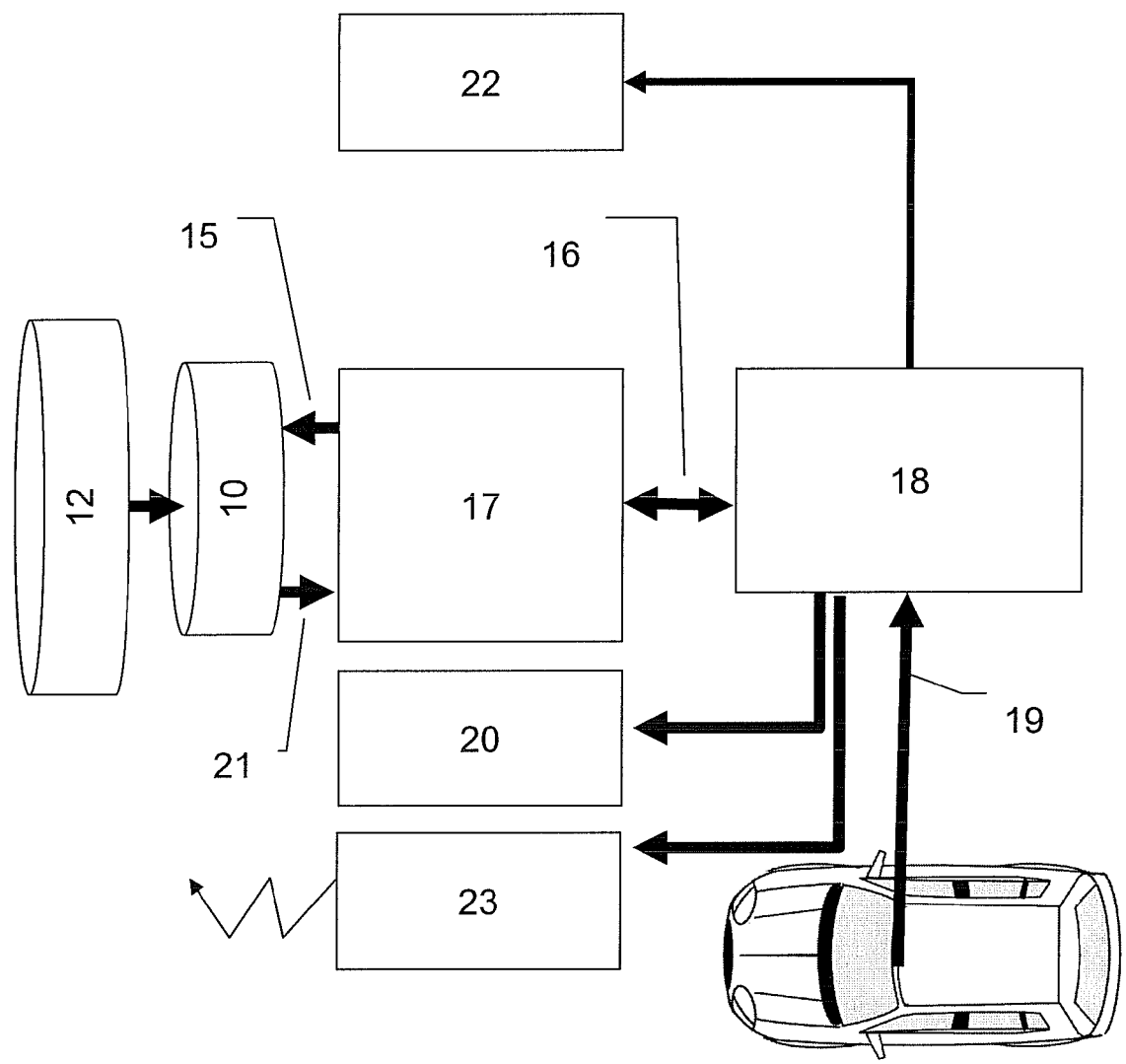
FIG. 6 shows the whole system.

FIG. 6 shows an embodiment which complements the embodiment of FIG. 2. For this application, the vehicle is tied into a rescue radio network. Thus, the existing UMTS and GSM networks can be used. The information regarding the accident is triggered by a crash sensor and transmitting the data is started by a transmitter 23. During transmission, primarily the GPS data is relevant with respect to the image data. The method according to the invention of data mixing in the data words of the CAN-bus solves a problem, which is being discussed at present. The automotive manufacturers have concerns to transmit the data of the CAN-bus, which is safety relevant for the vehicle, without encryption through the public access radio network. An encoding is performed through mixing the data. The data can only be retrieved from the data flow through suitable software.

In order to build such an eCall system, it is necessary to connect the recording device with its memory to the rescue center through the radio interface in case of an accident.

A person skilled in the art can conceive various options to implement this, using a mobile telephone through plug-in connection or radio interface, addressing a GSM/UMTS module through the vehicle bus system, or the integration of a radio module in the recording device itself, which radio module is only activated by the crash sensor and which transmits the content of the memory.

The invention claimed is:

1. A rear view mirror assembly for a vehicle having a vehicle bus system, said rear view mirror assembly comprising:
    a mirror housing having a primary opening;
    a reflective element housed within said mirror housing and visible through said primary opening, said reflective element showing images of a rearward direction;
    and a recording device for capturing and processing image data in a vehicle with an optical image generating sensor and with an image processor for processing image data, with a communication processor for bidirectional communication with the vehicle,
    wherein said recording device, optical image generating sensor, said image processor and said bidirectional communications processor are all housed within said mirror housing between said mirror housing and said reflective element,
    and the image data and is imaged into the data structure of the vehicle bus system together as mixed data.

2. A rear view mirror assembly according to claim 1, wherein the mixed data per byte is imaged into the data frame.

3. A rear view mirror assembly according to claim 1, wherein the recording device includes a storage medium which is connected to the optical sensor.

4. A rear view mirror assembly according to claim 1, wherein the image processor processes the image data and a data reduced image data set is stored in the memory.

5. A rear view mirror assembly according to claim 1, wherein the rear view mirror assembly is an exterior mirror.

6. A rear view mirror assembly according to claim 5, wherein the recording device performs the function of dead angle monitoring.

7. A rear view mirror assembly according to claim 1, wherein the rear view mirror assembly is an interior mirror.

* * * * *